US011128641B2

United States Patent
Zomlot et al.

(10) Patent No.: US 11,128,641 B2
(45) Date of Patent: Sep. 21, 2021

(54) PROPAGATING BELIEF INFORMATION ABOUT MALICIOUS AND BENIGN NODES

(71) Applicant: Hewlett Packard Enterprise Development LP, Houston, TX (US)

(72) Inventors: Loai Zomlot, Sunnyvale, CA (US); Pratyusa K. Manadhata, Piscataway, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 208 days.

(21) Appl. No.: 15/754,617

(22) PCT Filed: Aug. 28, 2015

(86) PCT No.: PCT/US2015/047380
§ 371 (c)(1),
(2) Date: Feb. 23, 2018

(87) PCT Pub. No.: WO2017/039576
PCT Pub. Date: Mar. 9, 2017

(65) Prior Publication Data
US 2018/0262516 A1  Sep. 13, 2018

(51) Int. Cl.
*H04L 29/00* (2006.01)
*H04L 29/06* (2006.01)
*H04L 29/12* (2006.01)

(52) U.S. Cl.
CPC .......... *H04L 63/14* (2013.01); *H04L 61/1511* (2013.01); *H04L 63/1425* (2013.01)

(58) Field of Classification Search
CPC .............................. H04L 63/14; H04L 61/1511
(Continued)

(56) References Cited

U.S. PATENT DOCUMENTS 8,533,819 B2   9/2013   Hoeflin et al.
8,701,190 B1   4/2014   Chan et al.
(Continued)

OTHER PUBLICATIONS

S. Staniford-Chen, S. Cheung, R. Crawford, M. Dilger, J. Frank, J. Hoagland, K. Levitt, C. Wee, R. Yip, D. Zerkle / GrIDS—A Graph Based Intrusion Detection System for Large Networks/ Feb. 22, 2015 pp. 1-11.*
(Continued)

*Primary Examiner* — Morshed Mehedi
*Assistant Examiner* — Michael D Anderson
(74) *Attorney, Agent, or Firm* — Hewlett Packard Enterprise Patent Department

(57) ABSTRACT

Example embodiments disclosed herein relate to propagating belief information about malicious and benign nodes. In one example, a domain name system (DNS) resolution graph including multiple nodes is determined. In this example, a first subset of nodes is determined based on an initial benign value or an initial unknown value associated with the respective nodes. In the example, benign belief information is propagated for the first subset based on the respective initial benign values. Moreover, in the example, a second subset of the nodes is determined based on an initial malicious value or an initial unknown value. Malicious belief information is propagated for the second subset based on the respective malicious values. The propagated belief information is copied to a DNS resolution graph.

15 Claims, 5 Drawing Sheets

(58) Field of Classification Search
USPC .......................................................... 726/23
See application file for complete search history.

(56) References Cited

U.S. PATENT DOCUMENTS

| | | | |
|---|---|---|---|
| 8,935,750 B2 | 1/2015 | Golovanov | |
| 8,938,803 B1 | 1/2015 | Roberts et al. | |
| 9,032,527 B2 | 5/2015 | Manadhata et al. | |
| 9,049,221 B1 | 6/2015 | Yen et al. | |
| 2010/0235915 A1* | 9/2010 | Memon | H04L 63/145 726/23 |
| 2013/0031171 A1 | 1/2013 | Serena | |
| 2013/0339158 A1 | 12/2013 | Xie et al. | |
| 2014/0090056 A1 | 3/2014 | Manadhata et al. | |
| 2015/0195299 A1* | 7/2015 | Zoldi | H04L 63/1408 726/25 |
| 2017/0041332 A1* | 2/2017 | Mahjoub | H04L 61/1511 |

OTHER PUBLICATIONS

International Searching Authority, The International Search Report and the Written Opinion, dated Jun. 13, 2016, PCT/US2015/047380, 10 Pgs.

Nordby, M.B., Security Incident Detection with Passive DNS Logs, May 2, 2014, 84 Pgs.

Tang, Y., et al., Catching Modern Botnets Using Active Integrated Evidential Reasoning, Jan. 10, 2014, 10 Pgs.

Zou, F., et al., Detecting Malware Based on DNS Graph Mining, Apr. 17, 2015, 13 Pgs.

Manadhata et al., "Detecting malicious domains via graph inference", In Computer Security-ESORICS 2014, Springer, 2014, 18 pages.

Zomlot et al., "Prioritizing intrusion analysis using Dempster-Shafer theory", AISec '11 Proceedings of the 4th ACM workshop on Security and artificial intelligence, 2011, pp. 59-70.

* cited by examiner

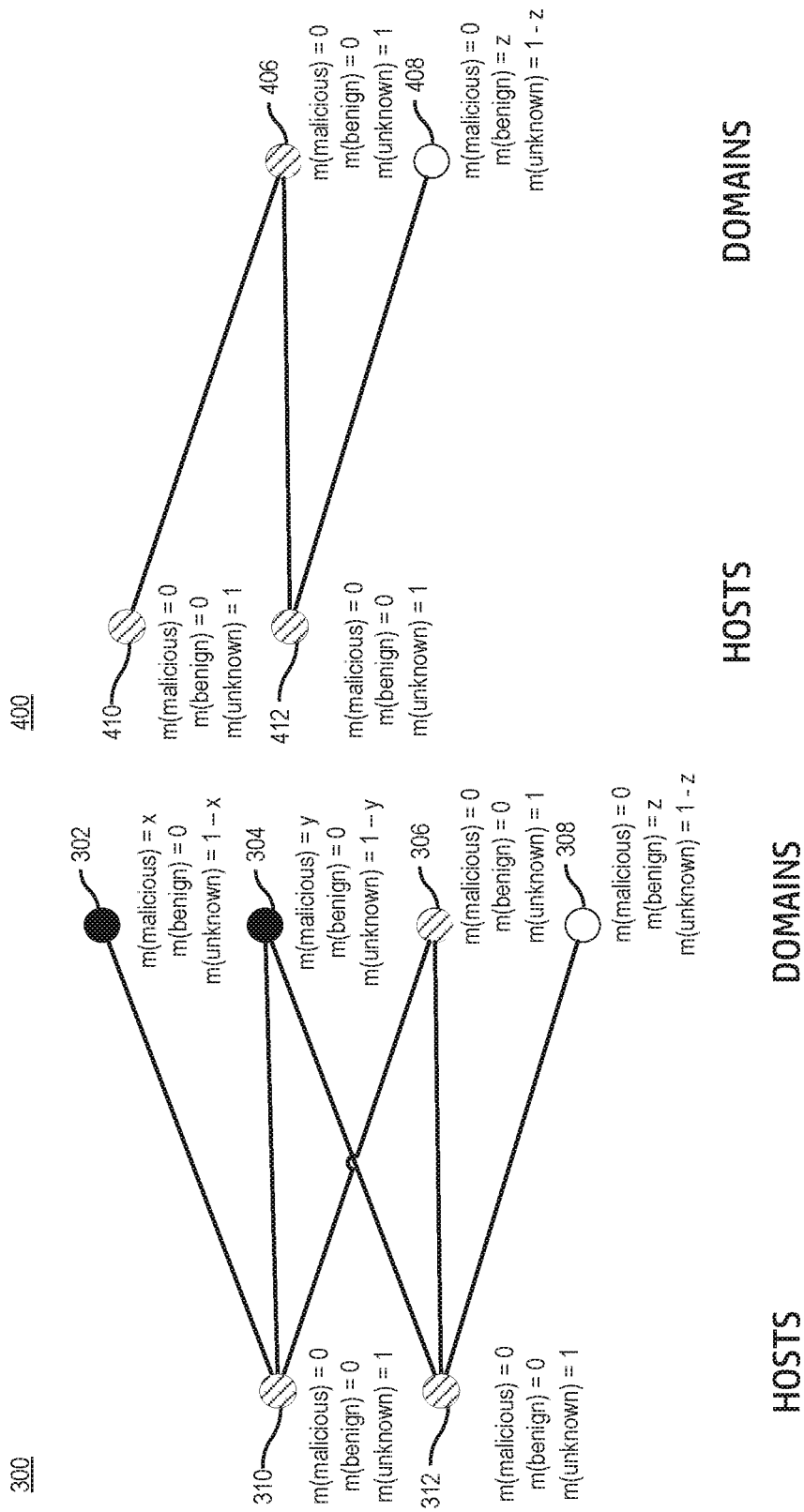

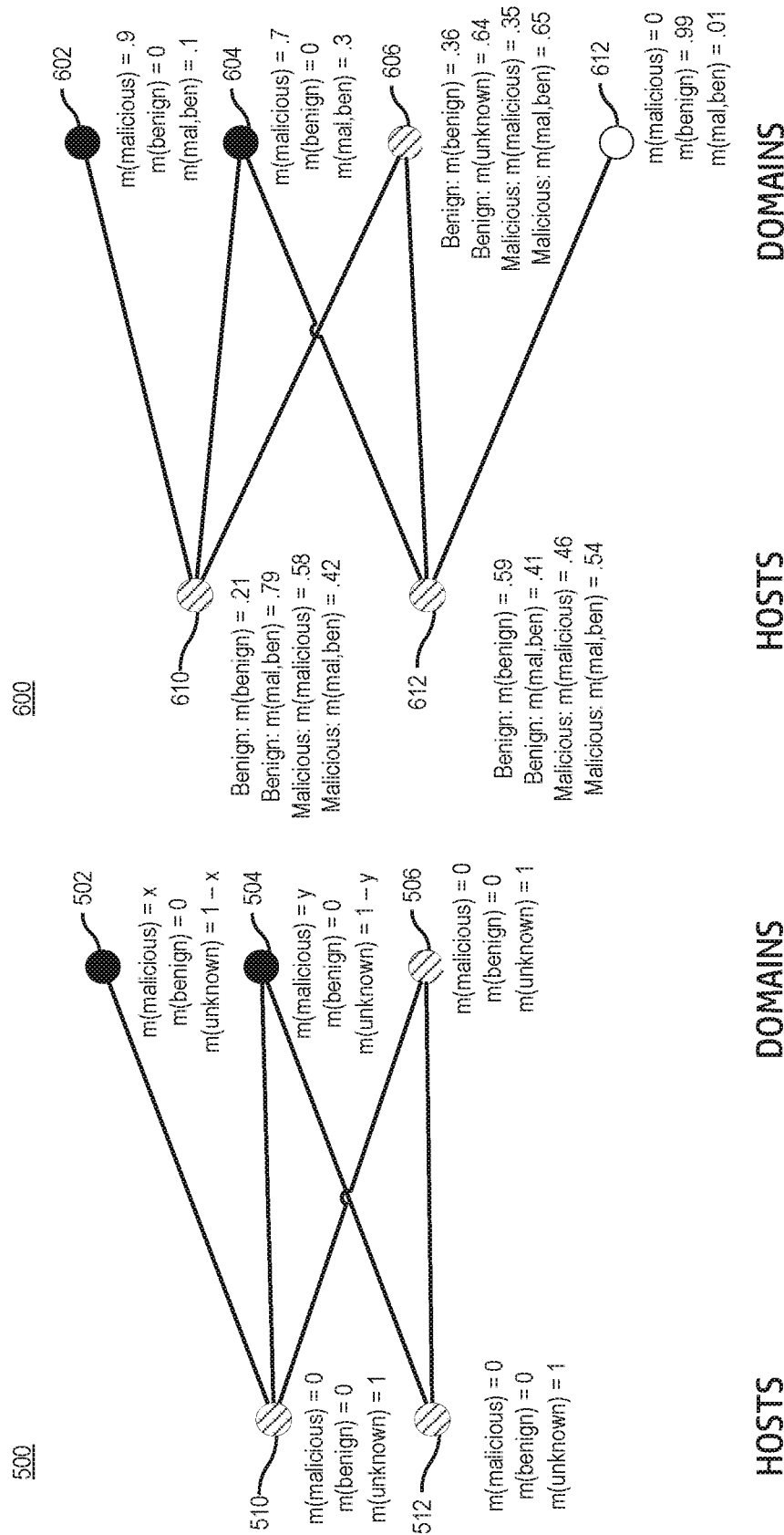

PROPAGATING BELIEF INFORMATION ABOUT MALICIOUS AND BENIGN NODES

Service providers and manufacturers are challenged to deliver quality and value to consumers, for example by providing secure networks. Many private networks (e.g., enterprise networks, home networks, business networks, etc.) have clients that may be infected with malware. It is desirable to protect these networks from malware.

BRIEF DESCRIPTION OF THE DRAWINGS

The following detailed description references the drawings, wherein:

FIGS. 3-6 are example domain name system resolution graphs for propagating beliefs, according to various examples;

DETAILED DESCRIPTION

Figure 1:
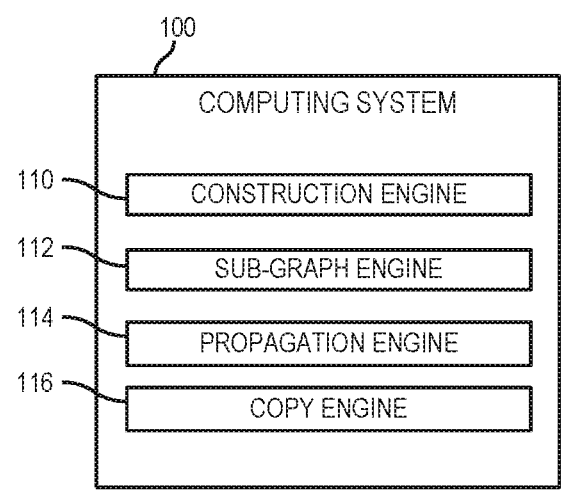
FIG. 1 is a block diagram of a computing system capable of propagating malicious and benign belief information, according to an example.

Malware infections can occur within private networks, such as enterprise networks, home local area networks (LANs), office networks, etc. Domains accessed by a network host can be indicative of whether the host is infected by malware. For example, many cyber-attacks can involve domain name system (DNS) infrastructure, for example, bots that communicate with their masters over DNS. In one example, a user of a host device in the private network may be sent a phishing email from an external source. The user may click on a link that leads to malware being installed on the host device. Once the malware is installed, a persistent channel to a command and control domain may be maintained for the malware to receive instructions. DNS requests and responses can be a source of information to identify cyber-attacks, malicious domains, and malware infected hosts.

Identifying malicious domains and benign domains accessed by the network's hosts or clients (e.g., users, user devices, other computing devices, etc.) is desirable for these private networks, particularly for enterprise networks. Some malicious and benign domains can be identified by comparing accessed domains to a domain blacklist and a domain whitelist. Moreover, likelihood that a host is malware infected may be determined by the domains the host visits.

However, blacklists and whitelists may not cover all domains. Some legitimate traffic may be directed towards this gray area. However, some of the gray areas may be malicious. Malicious activity by one host in a network may spread the infection to other hosts or hosts may be infected by the same malware from other means.

Accordingly, various embodiments described herein use whitelists and blacklists on domains and hosts accessed from within the private network to determine how likely a particular node is infected with malicious software or is benign. A DNS resolution graph including host nodes and domain nodes can be created from a log or multiple logs. Examples of logs that can be used include DNS logs, Hypertext Transfer Protocol (HTTP) proxy logs, other event logs, etc.

Initial belief values can be assigned to each of the nodes based on a blacklist and a whitelist. In some examples, each list can include multiple lists from a source or multiple sources. Evidence theory can be applied to propagate belief that particular nodes are infected based on the blacklist and whitelist.

Evidence theory or Dempster-Shafer theory is an approach to using belief functions as a framework to deal with uncertainty. In evidence theory, belief functions base degrees (or mass) of belief (e.g., confidence or trust) for a question on the probabilities for a related question. The approaches used herein also account for a mass of what is "unknown." As described herein, one question asked can be the belief that a node is malicious. Another question asked can be the belief that a node is benign. The "unknown" factor is the difference in mass between the total belief (e.g., 1 or 100%) and what is believed. As used herein, for a particular node, the mass of the node showing evidence for being believed to be benign m(benign) plus the mass of the node showing evidence for being believed to be malicious m(malicious) plus the mass of the unknown factor m(unknown) equals the total belief, (e.g., 1 or 100%). The values used for each can be scaled and different numbering schemes used (e.g., using a total belief of 100%), however, to simplify math in the description used herein, the total belief used herein will be 1, where the m(benign)+m(malicious)+m(unknown)=1. In certain examples, the mass of the unknown can be replaced with a mass of the node being benign or malicious m(benign, malicious) because the unknown factors are limited in choice between benign and malicious.

The initial values from the whitelist and the blacklist can be conflicted. For example, the whitelist may indicate with a mass m(benign) of 1 that a node is benign. Further, the blacklist may indicate with a mass m(malicious) of 1 that the same node is malicious. This poses a conflict. As such, the initial belief information can be populated as initial belief values. Uncertainty can be populated by an initial unknown value. For example, nodes that are not listed on the blacklist or the whitelist may have an unknown value of 1, a benign value of 0, and a malicious value of 0.

To avoid conflicts from the blacklist and whitelist, the DNS resolution graph belief propagation for the malicious beliefs and benign beliefs can be propagated separately. A first sub-graph is used and can include nodes assumed to be malicious based on the blacklist along with nodes that are not on the blacklist or on the whitelist. Belief masses as to whether each node is malicious can be propagated as further described below. The beliefs can be associated with the respective nodes of the DNS resolution graph. A second sub-graph can include nodes assumed to be benign based on the whitelist along with nodes that are not on the blacklist or the whitelist. Beliefs as to whether each node is benign can be propagated as further described below. That benign belief information can also be associated (e.g., copied to) with the respective nodes on the DNS resolution graph. The order that the sub-graphs are used can be interchanged. Once the belief information is associated with the DNS resolution graph, the belief information from the first sub-graph can be compared with the belief information of the second sub-graph to determine whether each node should be considered malicious or benign. Moreover, nodes believed to be malicious can be sorted based on their likelihood of being malicious (e.g., based on the respective m(malicious) of the nodes). The sorting can help an administrator or security professional determine an order to address node infections.

DNS information can be used to generate the DNS resolution graph. In certain examples, a client or host node is a computing device that requests at least one resolution of a domain name to an Internet Protocol (IP) address. The request can go to at least one DNS server, which can respond. The DNS information can be stored in a log. The information can be provided from the DNS server, a DNS snooper collecting information about DNS traffic, or the like. In certain examples, the log can include information about what host requested the query, the domain name, what the domain name was resolved to (e.g., the IP address, a non-existent domain, etc.), time information, a number of times the query was made, or the like. Further, log information can be kept for a time period and/or used for a time period.

The DNS resolution graph can be constructed by taking into account the DNS information. The graph can include host nodes and domain nodes. As used herein, a host node is a representation of a device on a network that is being examined that provides requests to the DNS server. The DNS server can respond to the DNS query. Further, as used herein, a domain node is a node representing a domain name used in a query to resolve to an IP address. The domain node can be represented in the form of a domain name in the request. When a host h requests a DNS resolution to domain d, an edge <h,d> can be added to the graph. In some examples, a host may also be a domain. Examples of DNS resolution graphs and sub-graphs are included in FIGS. 3-6.

Figure 2:
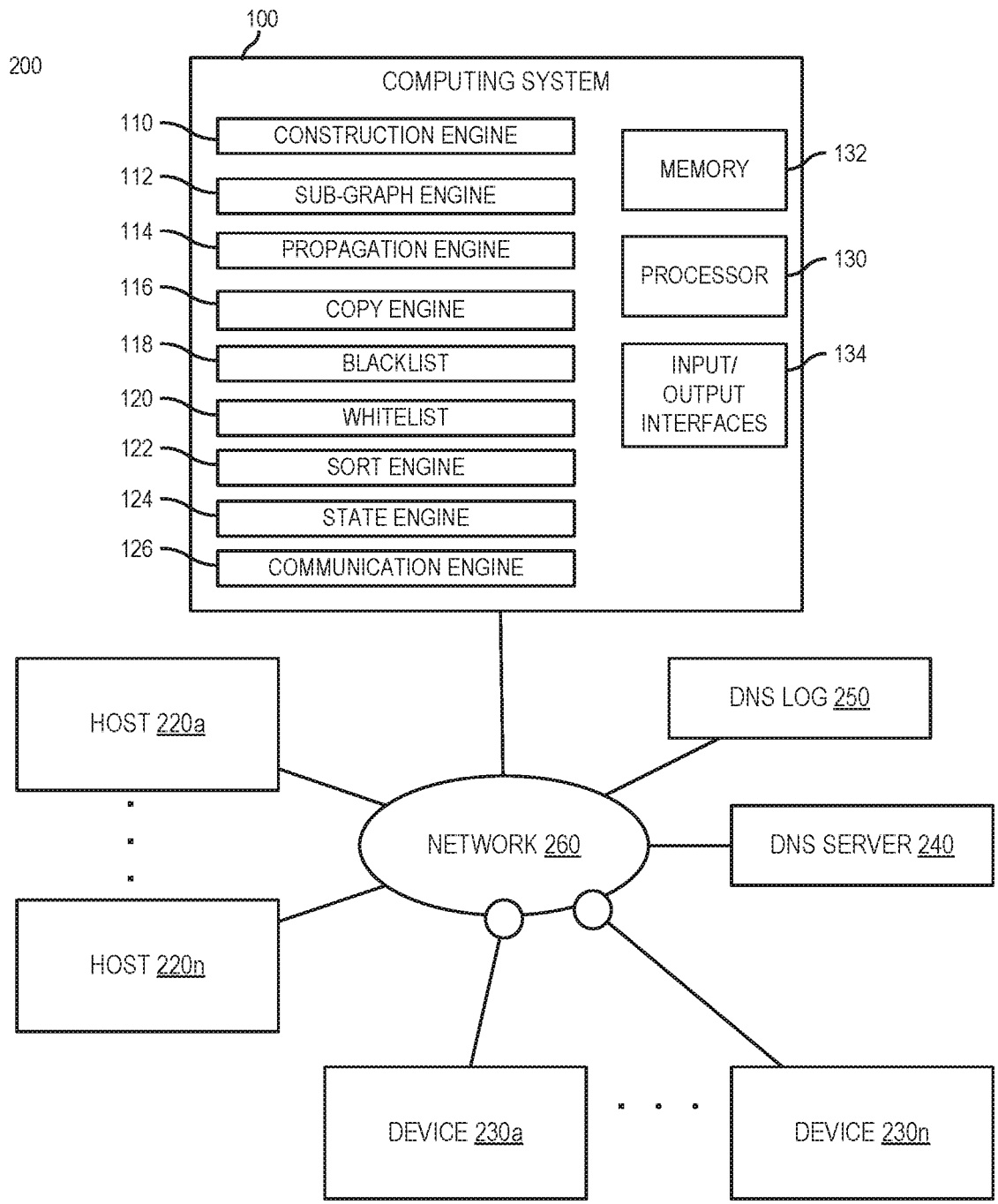
FIG. 2 is a block diagram of a system including a computing system capable of propagating malicious and benign belief information, according to an example.

FIG. 1 is a block diagram of a computing system capable of propagating malicious and benign belief information, according to one example. FIG. 2 is a block diagram of a system including a computing system capable of propagating malicious and benign belief information, according to one example.

According to FIG. 1, computing system 100 can include a construction engine 110, a sub-graph engine 112, a propagation engine 114, and a copy engine 116. Further, according to FIG. 2, the computing system 100 can further include a blacklist 118, a whitelist 120, a sort engine 122, a state engine 124, a communication engine 126, a processor 130, memory 132, and/or input/output interfaces 134. Memory 132 can include a machine-readable storage medium. Moreover, according to FIG. 2, system 200 can include the computing system 100, hosts 220a-220n that can communicate with DNS server(s) 240 to request and receive domain name information, a DNS log 250, and devices 230a-230n.

In certain examples, the hosts 220, the DNS log 250, and the DNS server(s) 240 can be part of an internal network (e.g., a home LAN, an office LAN, an enterprise LAN or network, etc.), while devices 230a-230n can be external to the internal network (e.g., as available through the Internet). In certain examples, an internal network can be considered a network that uses a private IP address space. A local network can connect to the Internet via a one or more devices, such as gateways, modems, etc.

The hosts 220, DNS log 250, DNS server 240, and devices 230 can connect to each other via network 260. The respective devices 220, 230, 240 may be a notebook computer, a desktop computer, a server, a workstation, or any other computing device capable of performing the recited functionality.

The construction engine 110 can construct a DNS resolution graph. The DNS resolution graph can include multiple host nodes representing hosts 220 of DNS server 240. Further, the DNS resolution graph can include multiple domain nodes representing domains of what is queried by the DNS server 240. The domain nodes can resolve external to the private network or internal to the private network. Moreover, the DNS resolution graph can include edges connected from the respective host nodes to the respective domain nodes. The edges connect the nodes if a host DNS query resolves to the respective domain associated with the respective domain nodes. Illustrations of the graphs are described further in reference to FIGS. 3-6. The construction engine 110 can construct the DNS resolution graph by creating a new data structure and populating the host nodes, domain nodes, and edges based on DNS information of the DNS server 240 (e.g., information from the DNS log 250), log information from another source including the DNS information (e.g., an HTTP proxy), etc. As noted, host nodes and domain nodes can be populated to sets based on the DNS information. Further, an edge between a client node and a domain node can be populated if a client node DNS query resolves to the associated domain of the domain node.

In some examples, the construction engine 110 can associate one or more of the nodes with initial belief information. Initial belief information can be set based on a blacklist, whitelist, or other list including information about potentially malicious domains. Nodes can be identified on the list based on an identifier (e.g., the domain name, an IP address, etc.). The initial belief information can be expressed values (e.g., an initial benign value, an initial malicious value). Further, an initial unknown value can be associated (e.g., the initial unknown value may be a default value). In some examples, the default value for the initial unknown value can be equal to 1 if no belief information is associated with a node based on the lists. In other examples, the default value may be a function of the associated belief(s). Each of the nodes should be associated with an initial malicious value, an initial benign value, an initial unknown value, or a combination thereof.

The sub-graph engine 112 can be used to determine sub-graphs of the DNS resolution graph based on the initial benign value, the initial malicious value, and/or the initial unknown value. In one example, a first sub-graph can be made that includes nodes with an initial benign value (e.g., based on a whitelist 120) and nodes with initial unknown values meeting particular criteria. In one example, the criteria can include the initial unknown value indicating that information about the node is unknown (e.g., the initial unknown value being one). In another example, a second sub-graph can be made that includes nodes with an initial malicious value (e.g., based on a blacklist 118) and nodes with initial unknown values meeting particular criteria. As noted, the criteria can include the initial value indicating that information about the node is unknown. In these examples, the first sub-graph can include nodes that are assumed to be benign with some amount of belief and nodes without initial information while the second sub-graph includes nodes that are assumed to be malicious with some amount of belief and nodes without initial information.

Propagation engine 114 can be used to propagate belief information for each sub-graph. In one example, the propagation engine 114 can propagate benign belief information for the first sub-graph based on the initial benign values. Examples of approaches to propagate the belief information is further discussed with reference to FIGS. 3-6 below. As used herein, benign belief information includes at least a representation of a mass of the belief that respective nodes are benign based on the initial benign values. The mass for the benign belief information can be represented in various ways, for example, the mass can be represented as m(benign) or as m(malicious) and m(malicious, benign), where m(malicious, benign) and m(malicious) can be used to determine m(benign). Additional information can also be included, for example, m(benign), m(malicious), and m(malicious, benign) can be included.

In one example, as further detailed in the description of FIGS. 3-6, a node can be selected. The node can be a node with an initial unknown value of a default value (e.g., 1). The belief information respective to that node can be determined by using the initial benign values of nodes connected to the node. For example, a formula can be used to propagate the information from the initial benign values to the node as further described with reference to FIGS. 3-6.

In one example, the propagation engine 114 can propagate benign belief information for the second sub-graph based on the initial malicious values. As noted, examples of approaches to propagate the belief information is further discussed with reference to FIGS. 3-6 below. As used herein, malicious belief information includes at least a representation of a mass of the belief that respective nodes are malicious based on the initial malicious values. The mass can be represented in various ways, for example, the mass can be represented as m(malicious) or as m(benign) and m(malicious, benign). Additional information can also be included, for example, m(benign), m(malicious), and m(malicious, benign) can all be included.

In one example, as further detailed in the description of FIGS. 3-6, a node can be selected. The node can be a node with an initial unknown value or a default value (e.g., 1). The belief information respective to that node can be determined by using the initial malicious values of nodes connected to the node. For example, a formula can be used to propagate the information from the initial malicious values to the node as further described with reference to FIGS. 3-6.

The copy engine 116 can be used to copy the belief information to another DNS resolution graph. In some examples, the other DNS resolution graph can be the same data structure created by the construction engine 110, which is then updated with the belief information. In other examples, a new data structure can be created with corresponding nodes and edges, which can be updated with the belief information.

In some examples, sub-graphs can be worked on in parallel. In other examples, the first sub-graph can be used to propagate belief information and be used to update the DNS resolution graph and then the second sub-graph can be used to propagate belief information and be used to update the DNS resolution graph. Data can be kept from the propagation of each sub-graph and the resulting DNS resolution graph can include both the benign belief information and the malicious belief information for the respective nodes.

The state engine 124 can be used to determine a malicious state (e.g., benign, malicious, etc.) for the nodes on the resulting DNS resolution graph. As used herein, "malicious state" is a representation of whether the belief information determines the state of a node to be associated with an infection. Similarly, as used herein, "benign state" is a representation that the belief information indicates that the node is not associated with infection. The determination can be based on a comparison of the benign belief information for respective nodes and the malicious belief information for the respective node. For example, the state can be indicative of an infection malicious if an m(malicious) of the malicious belief information is greater than or greater than or equal to the m(benign) of the benign belief information. In other examples, other criteria can be used for the comparison (e.g., there could be a weighting factor involved). Using this approach can limit conflicts between lists of information about nodes.

Moreover, sort engine 122 can be used to sort the nodes designated with the malicious state based on the m(malicious) of the nodes. The mass can represent a magnitude of the node's malicious belief information. Moreover, a security action can be performed on the sorted nodes. The communication engine 126 can be used to send a message to cause the security action. For example, the security action can identify the node (e.g., by internet protocol (IP) address, by host name, etc.) and send the message to a security professional to take action. In other examples, the security action can include isolating the node from private network, limiting access to nodes, etc.

As detailed herein, computing system 100 may include a series of engines 110, 112, 114, 116, 122, 124, 126 for determining whether nodes of a network 260 are infected. Each of the engines include hardware and may generally represent combinations of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described herein.

A processor 130, such as a central processing unit (CPU) or a microprocessor suitable for retrieval and execution of instructions, and/or electronic circuits can be configured to perform the functionality of any of the engines described herein. In certain scenarios, instructions and/or other information, such as DNS resolution graphs, can be included in memory 132. In some examples, input/output interfaces 134 may additionally be provided by the devices. Further, an output device, such as a display, can be utilized to present information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces.

The network 260 can use wired communications, wireless communications, or combinations thereof. Further, the network 260 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the network 260 can be in the form of a direct network link between devices. Various communications structures and infrastructure can be utilized to implement the communication network(s).

By way of example, the hosts 220, devices 230, and DNS server 240 communicate with each other and/or other components with access to the network 260 via a communication protocol or multiple protocols. A protocol can be a set of rules that defines how nodes of the network 260 interact with other nodes. Further, communications between network nodes can be implemented by exchanging discrete packets of data or sending messages. Packets can include header information associated with a protocol (e.g., information on the location of the network node(s) to contact) as well as payload information. As noted, hosts 220a-220n, DNS server 240, and/or the DNS log 250 may be in a separate network than devices 230a-230n. A firewall, edge device, or other device may be implemented to separate network 260 from devices 230a-230n.

FIGS. 3-6 are example domain name system resolution graphs for propagating beliefs, according to various examples. FIG. 3 shows a DNS resolution graph 300 including nodes 302, 304, 306, 308, 310, 312. In this example, nodes 310 and 312 are hosts where the host nodes request resolution to the domains 302, 304, 306, 308. The edges shown in between the nodes show the requests made from the respective hosts to the domains. The graph 300 shown is an example for illustrative purposes. A DNS resolution graph can include instances where some nodes or sets of nodes in the graph are not connected to other nodes or sets of nodes with the edges.

As noted above, initial benign, malicious, and/or unknown values can be associated. In this example, the initial benign value can correspond to m(benign), the initial malicious value can correspond to m(malicious), and the initial unknown value can correspond to m(unknown). In this example, a mass distribution function is assigned for each node. As used herein, a hypothesis is a belief based on evidence. The set of possible hypothesis for the mass distribution function for a node can include malicious, benign, or "malicious or benign." Thus, the options for the power set can include {{malicious}, {benign}, {malicious, benign}}. The values can be populated based on evidence that is given. The evidence used herein can come from a list or multiple lists, such as a whitelist and/or a blacklist. In some examples, a list can include evidence information about both how likely a node is malicious and/or benign.

In this example, a blacklist includes evidence information about node 302. In this example, the evidence shows a m(malicious) of x. There is no information about the m(benign), as such, the m(benign) is 0. The m(unknown) is 1−x because the total possible hypothesis in this example is 1. Similarly, a blacklist includes evidence information about node 304 with m(malicious) of y, m(benign) of 0, and m(unknown) of 1−y.

Moreover, in this example, a whitelist includes evidence information about node 308. The evidence shows a m(benign) of z. There is no evidence information about m(malicious), thus, the m(malicious) is 0. Moreover, the m(unknown) is 1−z because the total possible hypothesis in this example is 1 and the m(malicious)+m(benign)+m(unknown)=1.

Further, in this example, there is no evidence in the list(s) about nodes 306, 310, and 312. As such, m(malicious) and m(benign) both equal zero for these nodes. The m(unknown) is therefore set to 1. In some examples, m(unknown) is set to a default value when there is no information about m(malicious) and m(benign). For example, the default value could be represented as no information in the set, leading to the default condition that m(unknown)=1. In another example, m(unknown) is set to the possible hypothesis.

The graph can be split to do analysis on malicious and benign evidence information. Splitting the DNS resolution graph 300 can be desirous to avoid conflicts between information about benign nodes and information about malicious nodes using evidence theory. A first graph 400 includes nodes that have benign evidence information and nodes that have unknown or lack evidence information. A second graph includes nodes that have malicious evidence information and nodes that are unknown or lack evidence information.

FIG. 4 shows a DNS resolution graph 400 including nodes 406, 408, 410, 412. The DNS resolution graph 400 includes nodes that have benign evidence information, such as node 408 as well as nodes whose statuses are unknown such as nodes 406, 410, and 412. In this example, node 406 corresponds to node 306, node 408 corresponds to node 308, node 410 corresponds to node 310, and node 412 corresponds to node 312.

Similarly, FIG. 5 shows a DNS resolution graph 500 including nodes 502, 504, 506, 510, 512. The DNS resolution graph 200 includes nodes that have malicious evidence information, such as nodes 502 and 504 as well as nodes whose statuses are unknown such as nodes 506, 510, and 512. In this example, node 502 corresponds to node 302, node 504 corresponds to node 304, node 506 corresponds to node 306, node 510 corresponds to node 310, and node 512 corresponds to node 312.

The evidence information in each of the sub-graphs can be separately propagated. In one example, evidence from a known node can be translated to unknown nodes according to a table, such as Table 1. A node can be considered a "known node" if there is evidence (e.g., from a blacklist or a whitelist) that supports a belief of the node being benign or malicious. Example Table 1 uses a hemophilic relationship (i.e., nodes will likely act similarly to nodes that are connected) to translate between nodes. Evidence information is propagated by translating, via the table, belief from a source (known) node to a destination (unknown) node using a translation table. In the tables and formulas discussed below the term "malicious" may be referred to as "mal" and the term "benign" may be referred to as "ben."

TABLE 1

| Translate $node_i$ to $node_j$ with $\xi$ as a discounting factor | | | |
|---|---|---|---|
| $node_i$ | value | $node_j$ | Value |
| {mal} | $\omega$ | {mal} | $\omega \cdot \xi$ |
| {ben} | $\gamma$ | {ben} | $\gamma \cdot \xi$ |
| {mal, ben} | $1 - (\omega + \gamma)$ | {mal, ben} | $1 - \xi \cdot (\omega + \gamma)$ |

In the example above, the $\omega$ is used to show the m(mal) of $node_i$. Further $\gamma$ is used to show the m(ben) of $node_i$. A discounting factor $\xi$ is applied when translating between nodes to represent that one node's maliciousness status does not necessarily translate to another node's maliciousness status. Table 2 shows an example of a translation from node 408 to 412 in FIG. 4. The discounting factor can be selected, for example, based on a size of a private network, can be based on trial and error for a particular private network, etc. For example, a DNS resolution graph can be processed using a number of discounting factors and nodes determined to be malicious can be checked. This feedback can be used to select a discounting factor to use (e.g., the discounting factor with the most number of nodes determined to be malicious that were confirmed to have malicious code).

TABLE 2

| Example Translation from node 408 to 412 with discounting factor of .6 | | | |
|---|---|---|---|
| $node_{408}$ | value | $node_{412}$ | Value |
| {mal} | 0 | {mal} | 0 |
| {ben} | 0.99 | {ben} | 0.59 |
| {mal, ben} | 0.01 | {mal, ben} | 0.41 |

In this example, z, associated with node 408 equals 0.99. The translation factor equals 0.6 in this example, but can be different. The discounting factor provides for a m(ben) of 0.59 for node 412. Similarly, translations can occur for the other unknown nodes of FIGS. 4 and 5.

Though translation can be used directly when there is a single source of evidence, when there are a number of sources of evidence, a combination rule can be used. The combination occurs when multiple paths flow into a single node. For example, nodes 504 and 506 can be combined to serve as evidence for node 512 by using a combination rule (e.g., an extended Dempster-Shafer rule). The combination rule can include an ability to handle dependency between paths by estimating an overlapping factor.

With this approach, ψ[h1, h2] is used to denote the joint mass-distribution functions of the two evidences. Here h1 and h2 are hypothesis of associated with a set of known nodes. The equation, (1) m1,2(h)=Σψ[h1,h2] for h1∩h2=h (Formula 1) can be used for the combination. In the equation, his possible values are {mal} in the malicious graph or {ben} for the benign graph and {mal, ben} in both graphs. The following formulas can be used to calculate ψ[h1, h2] in the benign graph.

$$\psi[\{ben\},\{ben\}] = r1 \cdot m1(\{ben\}) + (1-r1) \cdot m1(\{ben\}) \cdot m2(\{ben\}) \quad \text{(Formula 2)}$$

$$\psi[\{ben\},\theta] = (1-r1) \cdot m1(\{ben\}) \cdot m2(\theta) \quad \text{(Formula 3)}$$

$$\psi[\theta,\{ben\}] = (1-r2) \cdot m1(\theta) \cdot m2(\{ben\}) \quad \text{(Formula 4)}$$

$$\omega[\theta,\theta] = r1 \cdot m2(\theta) + (1-r1) \cdot m1(\theta) \cdot m2(\theta) \quad \text{(Formula 5)}$$

Here, θ={mal, ben} and $r_1$, $r_2$ are the overlapping factors.

In the formulas above, {ben} can be replaced with {mal} in the case of the malicious graph. Moreover, in the host-domain DNS resolution graph the known nodes are used as a source for belief calculation. Further, the identities of the known nodes (or nodes with initial values) are propagated along the graph to the hypotheses that the known nodes imply. Thus, each hypothesis like $h_1$ or $h_2$ is associated with set of the known nodes that participate in the belief calculation of the hypothesis for an unknown node.

In one example, in FIG. 5, node 512 is associated with nodes 502 and 504's identities based on connections in the graph 500, though not directly connected. In the following formulas, let R1 and R2 be the two known-nodes sets associated with the hypothesis $h_1$ and $h_2$ to be combined using the combination equation, and R=$R_1 \cap R_2$. The following formulas are used to estimate the correlation between $h_1$ and $h_2$.

If α≤1, then $$r_1 = \frac{\sum_{n \in R} \delta_n}{\sum_{n \in R_1} \delta_n}, \quad r_2 = r_1 \cdot \alpha \quad \text{(Formula 6)}$$

else, $$r_2 = \frac{\sum_{n \in R} \delta_n}{\sum_{n \in R_2} \delta_n}, \quad r_1 = r_2 \cdot \alpha^{-1} \quad \text{(Formula 7)}$$

Here, $\delta_n$ is a quality metric (e.g., the malicious or benign mass-distribution value) for the known nodes, and α can be computed as:

$$\alpha = \frac{m_1(\{mal\}) \cdot (1 - m_2(\{mal\}))}{m_2(\{mal\}) \cdot (1 - m_1(\{mal\}))} \quad \text{(Formula 8)}$$

That is, the correlation between the two sources are gauged by dividing the overlapping evidence's weight by the total evidence weight of one branch. Since $r_1$ and $r_2$ are related, if one is estimated, the other can be computed using a. The above estimation ensures that both $r_1$ and $r_2$ are within [0, 1].

For example, to calculate the result of combining nodes 502 and 504 in FIG. 5, the overlapping factors $r_1$ and $r_2$ by are estimated by using formulas 6 and 7. In this example, nodes 504 and 506 belief values can be populated with $m_{504}(\{mal\})=0.70$ and $m_{506}(\{mal\})=0.35$, respectively. $R_1=\{node_{504}\}$ and $R_2=\{node_{502}, node_{504}\}$. The quality metrics for the known nodes (evidences) are $\delta_{node502}=0.9$ and $\delta_{node504}=0.7$. In FIG. 5, this would mean that x=0.9 and y=0.7 for this example. Then, α=4.33 from using formula 8. Since α>1, formula 7 is used, which results in $r_2=0.44$ and $r_1=0.10$.

After estimating the overlapping factors, the combination formulas 2-5 can be applied. The results are shown in Table 3.

TABLE 3

Combination example from FIG. 5, where θ = {mal, ben}, x = .9, and y = .7.

| ($node_{504}$, $node_{506}$) | ψ ($node_{504}$, $node_{506}$) | $node_{512}$ |
|---|---|---|
| ({mal}, {mal}) | 0.29 | {mal} |
| ({mal}, θ) | 0.41 | {mal} |
| (θ, {mal}) | 0.06 | {mal} |
| (θ, θ) | 0.24 | {θ} |

The combination of the two evidences result in four tuples. The elements in a tuple are from node 504 and node 506, respectively. To calculate each row, a combination formula is used. For examples, formula 2 can be used for the ({mal},{mal}) tuple, formula 3 for the ({mal},θ) tuple, formula 4 for the (θ, {mal}), and formula 5 for the (θ, θ) tuple.

The belief of ({mal})=0.76, which is calculated by adding up the values in the first three rows. Then translation will take the result into node 512, as explained above with reference to FIG. 4. In the case of combining more than two nodes, the approach can sort the nodes in descending order by respective belief values and can combine the values in a pairwise manner. Moreover, the propagated belief values from sub-graphs 400 and 500 can be used to populate DNS resolution graph 600.

FIG. 6 shows a DNS resolution graph 600 including nodes 602, 604, 606, 612, 610, 612 that respectively correspond to nodes 302, 304, 306, 308, 310, 312. In this example, x=0.9, y=0.7, and z=0.99 as discussed in the examples above. In this example, the unknown nodes are populated based on belief propagation for the benign sub-graph of FIG. 4 and the malicious sub-graph of FIG. 5.

In this example, each node has two belief sets, one generated through the benign sub-graph 400 and one generated through the malicious sub-graph 500. Evidence for nodes 602, 604, 612 are considered given because the nodes 602, 604, 612 were populated based on lists. Each node can be determined to be malicious or benign based on the belief sets. In one example, a basic comparison of which set has a greater mass can be used. For example, if the mass of the benign set m(benign) is greater than the mass of the malicious set m(malicious), then the node can be considered benign (e.g., node 612). On the other hand, if m(malicious) is greater than m(benign), the nodes can be considered malicious (e.g., nodes 606 and 610). In other examples, other comparison formulas can be used, for example, if the m(malicious) is greater than or equal to the m(benign), then the node can be considered malicious.

Nodes that are determined to be malicious can be ranked. A security action may be taken on the nodes. For example, for a node within a private network, a message can be sent to a security professional to take action. In another example, a set of nodes with the greatest mass of being malicious can be provided to the security professional. In another example, a node not within the private network can be reported to a blacklist service.

Figure 7:
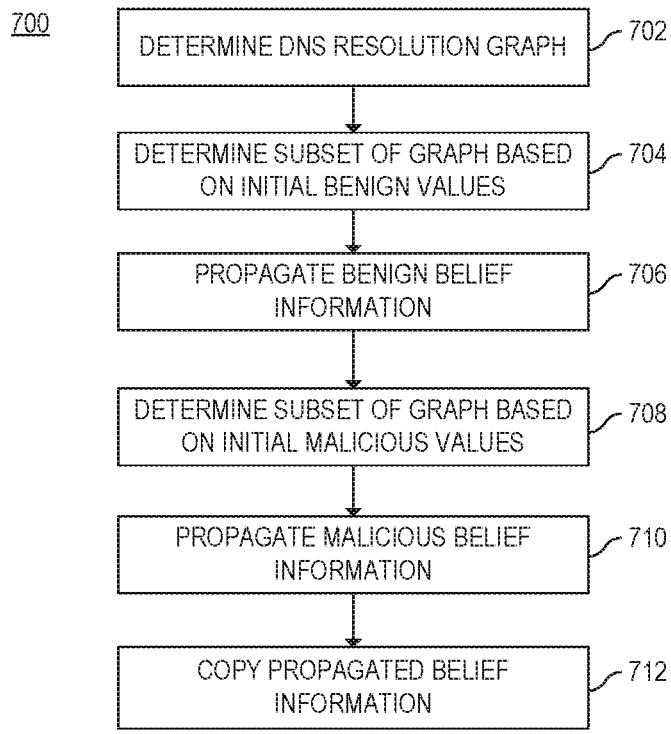
FIG. 7 is a flowchart of a method for propagating malicious and benign belief information, according to an example.
Figure 8:
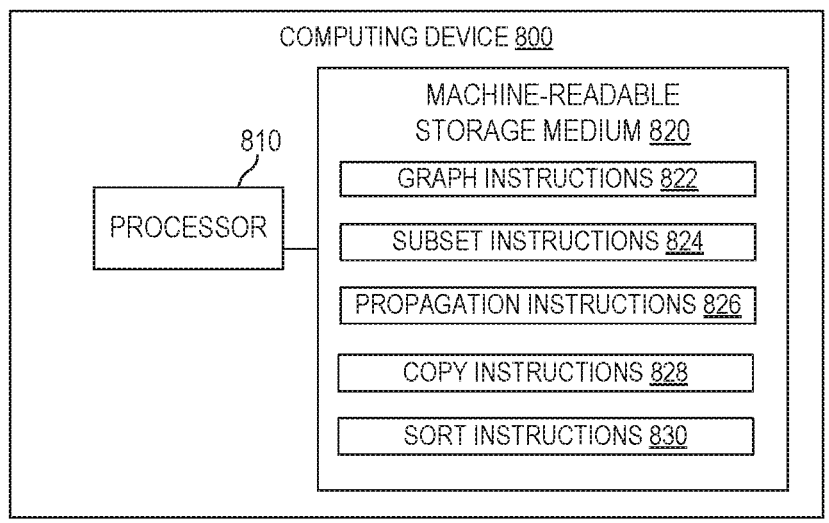
FIG. 8 is a block diagram of a computing device capable of propagating malicious and benign belief information to determine malicious nodes, according to an example.

FIG. 7 is a flowchart of a method for propagating malicious and benign belief information, according to one example. FIG. 8 is a block diagram of a computing device capable of propagating malicious and benign belief information to determine malicious nodes, according to one example. Although execution of method 700 is described below with reference to computing device 600, other suitable components for execution of method 700 can be utilized (e.g., computing system 100). Additionally, the components for executing the method 700 may be spread among multiple devices. Method 700 may be implemented in the form of executable instructions stored on a machine-readable storage medium, such as storage medium 820, and/or in the form of electronic circuitry.

The computing device 800 includes, for example, a processor 810, and a machine-readable storage medium 820 including instructions 822, 824, 826, 828, 830 for marking nodes of a network for analysis. Computing device 800 may be, for example, a notebook computer, a desktop computer, a workstation, a server, or any other computing device capable of performing the functionality described herein.

Processor 810 may include at least one central processing unit (CPU), at least one semiconductor-based microprocessor, at least one graphics processing unit (GPU), other hardware devices suitable for retrieval and execution of instructions stored in machine-readable storage medium 820, or combinations thereof. For example, the processor 810 may include multiple cores on a chip, include multiple cores across multiple chips, multiple cores across multiple devices (e.g., if the computing device 800 includes multiple node devices), or combinations thereof. Processor 810 may fetch, decode, and execute instructions 822, 824, 826, 828, 830 to implement method 700. As an alternative or in addition to retrieving and executing instructions, processor 810 may include at least one integrated circuit (IC), other control logic, other electronic circuits, or combinations thereof that include a number of electronic components for performing the functionality of instructions 822, 824, 826, 828, 830.

Machine-readable storage medium 820 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 820 may be encoded with a series of executable instructions for associating nodes with labels. Further, in some examples, the various instructions 822, 824, 826, 828, 830 can be stored on different media.

At 702, graph instructions 822 can be executed by processor 810 to determine a DNS resolution graph including multiple nodes. As noted above, the graph can be constructed out of one or more logs, for example, a log of DNS requests from host nodes to domain nodes. In other examples, the computing device 800 can receive the graph from another device. In some examples, belief information can be pre-populated. Host nodes can represent host machines and domain nodes can represent domain machines. In some examples, a host node can also be a domain node (e.g., when a domain resolves within a private network that the host node is in).

In some examples, each node can be associated with an initial value representing provided information as to the likelihood that the node is malicious or benign. For example, a portion of the nodes can be associated with a whitelist and an initial benign value can be populated for the respective nodes. In another example a portion of the nodes can be associated with a blacklist and an initial malicious value can be populated for the respective nodes. In some examples, the values can be in the form of belief functions (e.g., m(benign) and m(malicious)). Further, an initial unknown value may be associated with the nodes. In some examples, a node that does not have an associated benign belief value or a malicious belief value can have an inferential unknown value set at a default value. In other examples, the value can be set to the default value if there is no belief information about the node. As such, the respective nodes can be associated with an initial benign value, an initial malicious value, an initial unknown value, or a combination thereof.

At 704, subset instructions 824 can be executed to determine a subset of the DNS resolution graph for benign belief information based on initial benign values and initial unknown values. In one example, the subset can be in the form of a DNS resolution sub-graph. The subset can include nodes that have populated benign belief information as well as nodes that do not have any belief information. At 706, propagation instructions 826 can be executed to propagate belief information from the nodes with benign belief information to the nodes without belief information based on the initial belief values.

At 708, subset instructions 824 can be executed to determine a subset of the DNS resolution graph for malicious belief information based on initial malicious values and initial unknown values. In one example, the subset can be in the form of a DNS resolution sub-graph. The subset can include nodes that have populated malicious belief information as well as nodes that do not have any belief information. At 710, propagation instructions 826 can be executed to propagate belief information from the nodes with malicious belief information to the nodes without belief information based on the malicious belief values.

At 712, copy instructions 828 can be executed by processor 810 to copy propagated belief information to another DNS resolution graph. In some examples, the other DNS resolution graph can be an updated DNS resolution graph that was initially constructed. In other examples, the other DNS resolution graph can be a new instance of the DNS resolution graph. When the belief information is copied, belief information from the sub-graphs can be copied to the corresponding node in the other DNS resolution graph.

The order of processing and copying the benign subset and the malicious subset can be changed. For example, one subset could be processed first or both can be processed in parallel. In some examples, one subset can be processed and belief information copied to the other DNS resolution graph followed by the other subset being processed and copied to the other DNS resolution graph.

As noted above, the propagated belief information from both subsets can be kept and separately recorded as shown in the example of FIG. 6. The separate propagated belief information can be used to determine a malicious state for each of the respective nodes according to a rule. For example, the rule can state that if a node is associated with a greater than or equal m(malicious) than m(benign), the node is considered to have a malicious state indicative of infection. Similarly, the other nodes can be considered to have a benign state. Moreover, nodes that are indicated to have a malicious state can be sorted by executing sort instructions 830 based on magnitude of the m(malicious). The nodes can also be identified (e.g., by IP address, a user of the node, etc.). The information about the sorted nodes can be sent to a security professional or automated system. The security professional or automated system can perform a security action (e.g., limiting network access to the node, putting the node on a blacklist, removing the infection from the node, etc.).

What is claimed is:

1. A non-transitory machine-readable storage medium comprising instructions for propagating belief information about malicious and benign nodes, the instructions executable by a processor of a computing device to:
   determine a domain name system (DNS) resolution graph including a plurality of nodes,
   determine a first subset of the nodes that are associated with benign activity based on a first portion of the first subset of the nodes that are on a whitelist and based on a second portion of the first subset of the nodes that are not on a blacklist and not on the whitelist, wherein an initial benign value is associated with the first portion of the first subset of the nodes that are on the whitelist and an initial unknown value is associated with the second portion of the first subset of nodes that are not on the blacklist and not on the whitelist;
   propagate benign belief information for the first subset based on the respective initial benign values;
   determine a second subset of the nodes that are associated with malicious activity based on a first portion of the second subset of the nodes that are on the blacklist and based on a second portion of the second subset of the nodes that are not on a blacklist and not on the whitelist, wherein an initial malicious value is associated with the first portion of the second subset of the nodes that are on the blacklist and the initial unknown value is associated with the second portion of the first subset of nodes that are not on the blacklist and not on the whitelist;
   propagate malicious belief information for the second subset based on the respective malicious values, wherein the malicious belief information for the second subset is propagated separately from the benign belief information for the first subset; and
   copy the propagated benign belief information and the propagated malicious belief information to another DNS resolution graph corresponding to the DNS resolution graph.

2. The storage medium of claim 1, wherein the instructions to populate the other DNS resolution graph comprise instructions to:
   create the other DNS resolution graph including a plurality of other nodes corresponding to the nodes;
   for each node of the DNS resolution graph, copy corresponding benign belief information from the first subset and/or corresponding malicious belief information from the second subset to the corresponding other node of the other DNS resolution graph.

3. The storage medium of claim 2, further comprising instructions executable by the processor to:
   determine a malicious state for each other node of the other DNS resolution graph based on a comparison of the respective benign belief information and the respective malicious belief information for the respective other node.

4. The storage medium of claim 3, further comprising instructions executable by the processor to:
   sort the nodes with a respective malicious state indicative of infection based on a magnitude of the respective node's malicious belief information.

5. The storage medium of claim 4, further comprising instructions executable by the processor to:
   cause initiation of a security action based on a first one of the sorted nodes.

6. The storage medium of claim 1, further comprising instructions executable by the processor to: set the initial malicious value of the first portion of the second subset of the nodes according to the blacklist.

7. The storage medium of claim 6, wherein the instructions to propagate malicious belief information comprise instructions to:
   select one of the nodes associated with the respective initial unknown value;
   determine a third subset of the nodes, the third subset based on respective initial malicious values of the nodes that are connected to the one node according to the DNS resolution graph; and
   set the respective malicious belief information of the one node based on the respective initial malicious values of the third subset of the nodes.

8. The storage medium of claim 1, further comprising instructions executable by the processor to: set the initial benign value associated with the first portion of the first subset of the nodes according to the whitelist, and
   wherein the instructions to propagate benign belief information comprise instructions to:
   select one of the nodes based on the associated respective initial unknown value of the one node;
   determine a third subset of the nodes, the third subset based on respective initial benign values of the nodes that are connected to the one node according to the DNS resolution graph; and
   set the respective benign belief information of the one node based on the respective initial benign values of the third subset of the nodes.

9. A system for propagating belief information about malicious and benign nodes, the system comprising:
   a construction engine to construct a DNS resolution graph including a plurality of nodes from log data, wherein the nodes include a plurality of host nodes representing hosts and a plurality of domain nodes representing domains in the graph,
   wherein each node is associated with at least one of: an initial benign value, an initial malicious value, and an initial unknown value;

a sub-graph engine to determine a first sub-graph of the DNS resolution graph including nodes that are associated with benign activity based on a first portion of nodes in the first sub-graph that are on a whitelist and based on a second portion of nodes in the first sub-graph that are not on a blacklist and not on the whitelist, wherein the initial benign value is associated with the first portion of nodes in the first sub-graph that are on the whitelist and the initial unknown value is associated with the second portion of nodes in the first sub-graph that are not on a blacklist and not on the whitelist and to determine a second sub-graph of the DNS resolution graph including nodes that are associated with malicious activity based on a first portion of nodes in the second sub-graph that are on the blacklist and a second portion of nodes in the second sub-graph that are not on the blacklist and not on the whitelist, wherein the initial malicious value is associated with the first portion of nodes in the second sub-graph that are on the blacklist and the initial unknown value is associated with the second portion of nodes in the second sub-graph that are not on the blacklist and not on the whitelist;

a propagation engine to propagate benign belief information for the first sub-graph based on the respective initial benign values and to propagate malicious belief information for the second sub-graph based on the initial respective malicious values, wherein the malicious belief information for the second sub-graph is propagated separately from the benign belief information for the first sub-graph; and a copy engine to copy the benign belief information and the malicious belief information to another DNS resolution graph, the other DNS resolution graph corresponding to the DNS resolution graph.

10. The system of claim 9, wherein the construction engine is further to:

set the respective initial benign values according to the whitelist and set the respective initial malicious values according to the blacklist; and set the respective initial unknown values to a default value if the respective node is not associated with the whitelist or the blacklist.

11. The system of claim 10, wherein the propagation engine is further to:

select one of the nodes on the first sub-graph with the respective initial unknown value set to the default value; and determine the respective initial benign belief information for the selected one node based on respective initial benign values of nodes that are connected to the selected one node on the first sub-graph.

12. The system of claim 11, wherein the propagation engine is further to:

select a corresponding one of the nodes on the second sub-graph that corresponds to the selected one node; and determine the malicious belief information for the corresponding one node based on respective initial malicious values of a plurality of the nodes that are connected to the corresponding one node on the second sub-graph.

13. A method for propagating belief information about malicious and benign nodes implemented in a computer system comprising a physical processor and a non-transitory machine-readable storage medium, the method comprising:

determining a DNS resolution graph including a plurality of nodes from log data, wherein the nodes include a plurality of host nodes representing hosts and a plurality of domain nodes representing domains in the graph, wherein each node is associated with at least one of: an initial benign value, an initial malicious value, and an initial unknown value;

determining a first sub-graph of the graph including nodes that are associated with benign activity based on a first portion of nodes in the first sub-graph that are on a whitelist and based on a second portion of nodes in the first sub-graph that are not on a blacklist and not on the whitelist, wherein the initial benign value is associated with the first portion of nodes in the first sub-graph that are on the whitelist and the initial unknown value is associated with the second portion of nodes in the first sub-graph that are not on the blacklist and not on the whitelist;

propagating benign belief information for the first sub-graph based on the respective initial benign values;

copying the benign belief information for each of the nodes of the first sub-graph to the DNS resolution graph;

determining a second sub-graph of the graph including nodes that are associated with malicious activity based on a first portion of nodes in the second sub-graph that are on the blacklist and a second portion of nodes in the second sub-graph that are not on the blacklist and not on the whitelist, wherein the initial malicious value is associated with the first portion of nodes in the second sub-graph that are on the blacklist and the initial unknown value is associated with the second portion of nodes in the second sub-graph that are not on the blacklist and not on the whitelist;

propagating malicious belief information for the second sub-graph based on the respective initial malicious values, wherein the malicious belief information for the second sub-graph is propagated separately from the benign belief information for the first sub-graph; and copying the malicious belief information for each of the nodes of the second sub-graph to the DNS resolution graph.

14. The method of claim 13, further comprising:

determining a malicious state for each node of the DNS resolution graph based on the respective benign belief information and the respective malicious belief information for the respective node.

15. The method of claim 14, further comprising:

sorting the nodes with a respective malicious state indicative of infection based on a magnitude of the respective node's malicious belief information.

* * * * *